Jan. 8, 1946. S. ALSOP 2,392,354
FILTER
Filed Oct. 21, 1942   2 Sheets-Sheet 1
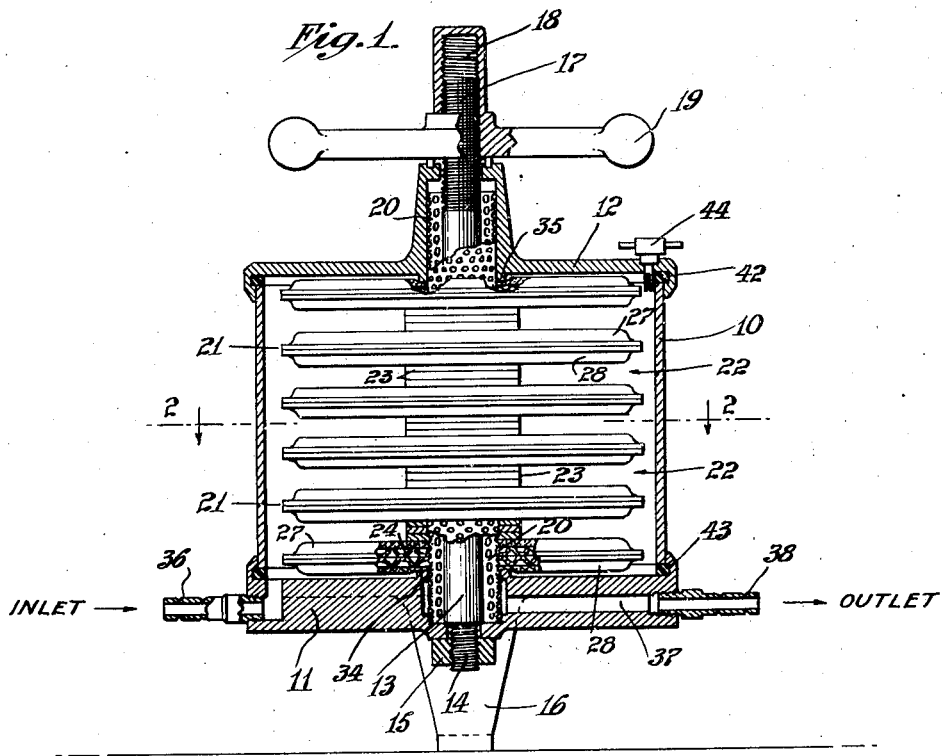
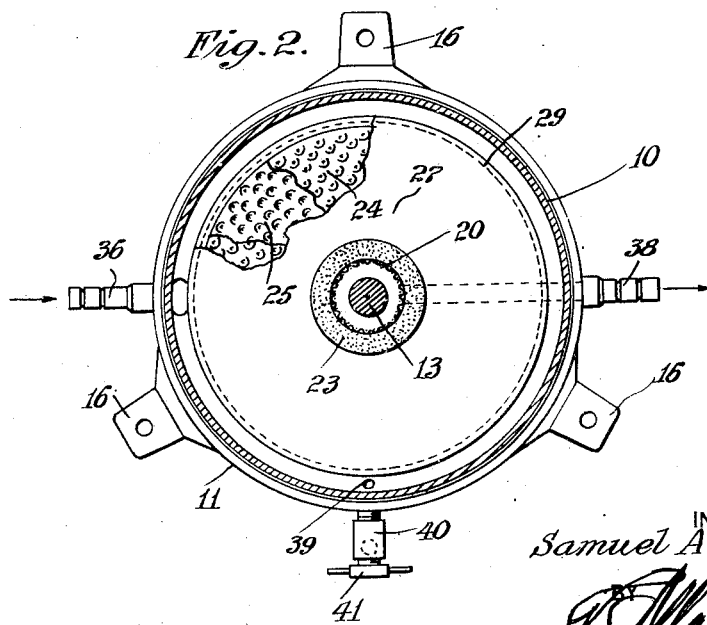
INVENTOR
Samuel Alsop
ATTORNEY Jan. 8, 1946.                    S. ALSOP                    2,392,354
FILTER
Filed Oct. 21, 1942          2 Sheets-Sheet 2
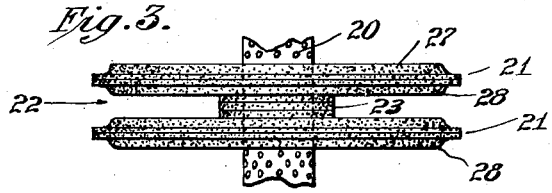
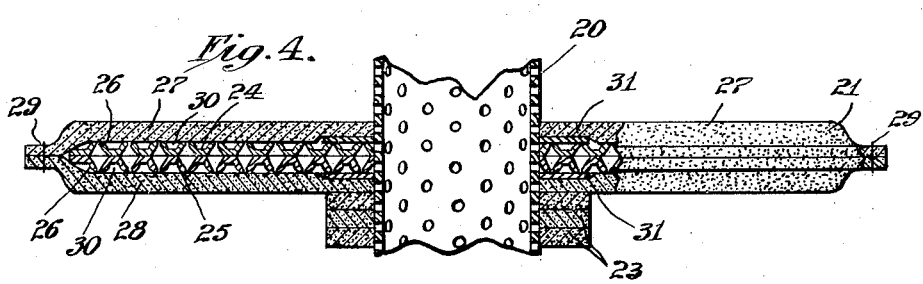
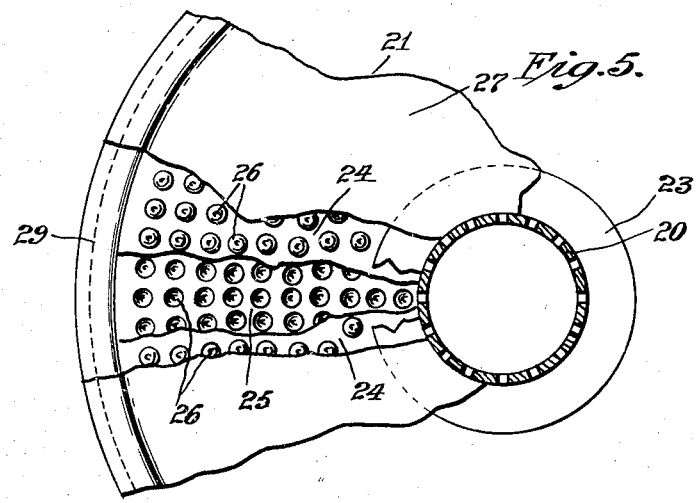
   
INVENTOR
Samuel Alsop
ATTORNEY Patented Jan. 8, 1946

2,392,354

UNITED STATES PATENT OFFICE 2,392,354

FILTER

Samuel Alsop, Milldale, Conn.

Application October 21, 1942, Serial No. 462,783

6 Claims. (Cl. 210—181)

This invention relates generally to filters of the type shown in my copending application Serial Number 300,918, now Patent 2,313,612, issued March 9, 1943, and more particularly to improvements in filtering units.

Heretofore in such filters, the filtering pack or unit included large metallic rings and disks, which material is expensive and in times of emergency difficult to obtain.

Furthermore when such filter units needed to be repaired, replaced or cleaned because clogged, it was customary to remove the top of the filter casing, disassemble the filter parts and reassemble the same with precision, all of which was laborious, time consuming and awkward especially in inconvenient places, such as the hold of a ship.

To overcome these difficulties and objections, I provide a filter unit that is so inexpensive to manufacture that upon clogging or damage to the filter unit or parts it will be economical to throw away the parts of the filter unit or the entire pack itself and replace same with new parts or an entire filter pack instead of cleaning or repairing the old.

Another object is to produce a filter that is leakproof and foolproof.

Another object is to produce a filter, the parts of which are readily replaced or repaired.

In carrying out my invention, I provide a filtering pack comprising a central perforated tubular member supporting a plurality of disk or plate units, all of the parts of which are formed of cheap paper or pulp and which units may be spaced from each other by washer members of similar material, the details and spacing depending upon the type of liquid to be filtered. Certain features however are applicable to the use of metallic filter units.

My invention will be understood from the description thereof to follow taken in connection with the accompanying drawings, in which Fig. 1 is a longitudinal sectional view of a filter embodying one form of my invention.

Fig. 2 is a sectional view taken on the plane of the line 2—2 of Fig. 1.

Fig. 3 is a side view on a small scale of a complete filtering pack.

Fig. 4 is a detail view on an enlarged scale showing a supporting member and filtering unit in section.

Fig. 5 is a plan view on an enlarged scale of a part of a filtering unit, parts being broken away and parts being shown in section.

Fig. 6 is a detail view in section showing one form of spacing disk.

Fig. 7 is a detail view in section showing another form of spacing disk.

As illustrated, the outer casing 10 is provided with a base portion 11 and a cover 12. A bolt 13 has threads 14 at its lower end engaging a nut 15 on the underside of the base, the base being raised by the supporting legs 16. The upper end of the bolt 13 is also provided with threads 17 for cooperation with a nut 18 of the general shape indicated and having arms 19 by means of which substantial force may be applied to compress the filter units and tightly hold the base and cover against the ends of the casing 10.

In one form the filtering pack comprises a central tubular perforated metal member 20 which is removably positioned over the bolt 13 and seats in the base. A plurality of filtering units 21 are removably supported on the tubular member 20 and each unit is spaced from its adjacent unit as indicated at 22 by a washer or washers 23, the number or size of the washers depending upon the spacing desired, and the spacing depending upon the kind of liquid to be filtered.

In Fig. 4 a detail of one form of filtering unit is shown. Each unit comprises a pair of spacing disks or plates 24 and 25 formed of absorbent paper, metal or other suitable material and positioned adjacent each other. Each disk member may be embossed or formed so that one of its surfaces has projections 26.

Surrounding and enclosing each pair of disks 24 and 25 is a pair of filtering elements 27 and 28 formed of paper pulp, or other suitable material but larger in area so that their peripheries extend beyond the peripheries of the disks 24 and 25.

These filtering elements are in the form of quite thick pads as shown and are quite different from ordinary thin filter paper which is extremely fragile especially when wet. The outer peripheries of the filtering elements extend around the disks 24, 25 and radially outwardly with their edges overlapping and secured together by stitching 29. The edges may of course be secured in any other suitable manner such as stapling, gluing, etc. The disks 24 and 25 may however be made the same size as the filtering elements 27 and 28 in which case the peripheries of the disks and elements may all be secured together and if made of metal may be spot welded. The surfaces of the disks 24 and 25 having the projections are preferably placed facing the filtering elements to provide a space 30 between each such surface and the adjacent filtering element.

Instead of having two spacing disks such as disks 24 and 25, between the filtering elements, a single disk 32 shown in Fig. 7 may be used. This disk 32 is punched so that projections 33 are formed on both surfaces thereof. A washer 31 may be placed between this disk 32 and each of the filtering elements also if desired.

It will be understood that the size of the space 22 between the adjacent filtering units may be regulated by the number or size of the washers 23 placed between them. The size of this space depends on the character of the work.

It also may be found desirable to reinforce the embossed projections adjacent the inner peripheries or over the entire embossed area of such disks 24 and 25, when they are made of paper, to prevent the projections from being crushed when heavy pressure is exerted thereon. This may be done by suitably coating such embossed portions with a preparation such as shellac or the like.

In assembling the filter, with the top cover removed and the bolt 13 in position, the filter pack is inserted by placing the central perforated outlet member 20 over the bolt 13 until the lowermost end thereof is seated on the base when the units are pressed downwardly along the member 20 until the lowermost filtering element impinges against the annular extension 34 on the base. The cover is then put on the upper end of casing 10 and moved downwardly by means of the nut 18 and arms 19 until the annular inward extension 35 on its under surface engages the upper surface of the uppermost filtering element. Further downward movement of the cover will exert a squeezing action on the filtering units and spacing washers 23 as will be understood.

In use, the liquid to be filtered enters through an inlet pipe 36 to the interior of the casing and between the filtering units into the spaces 22 where it seeps through the outer peripheries and outer surfaces of the filtering elements 27, 28 to the interior spaces 30 and then flows radially and inwardly between the filtering elements and the adjacent spacing disk 24 or 25 to the interior of the central tubular outlet member 20 and from said central outlet member to the outlet passage 37 in the base leading to the outlet pipe 38. Some of the liquid in the spaces 22 also seeps through the spacing washers 23. The pressure exerted by the annular extensions 35 and 34 of the cover and base, respectively, on the uppermost and lowermost filtering elements, respectively, prevents any leakage of unfiltered liquid into the outlet at these points.

It will be understood of course that instead of having such annular extensions or instead of having them impinge against the adjacent filtering elements, a washer or washers 23 may be placed between the cover and base and the respective adjacent filtering elements.

The casing may be provided with a drain 39 leading to a drain pipe 40 in which is a valve 41 for normally holding the drain closed but which may be opened to allow drawing off of sediment or other filtered impurities through the drain opening. Gasket or packing strips 42 and 43 may be placed between the casing 10 and the cover and base, respectively. The cover is provided with a threaded hole receiving a vent valve 44 which when closed seals the inside of the casing from the outside. When the valve is opened any gas accumulated is permitted to escape, or air can enter when draining out the filter.

A filtering pack comprises a perforated tubular member removably supporting a number of filtering units 21. Such a pack may have two filtering units such as shown in Fig. 3 or it may have any desired number. A quantity of these packs may be kept in stock for use when needed.

When the filtering units or parts thereof become clogged from dirt or become damaged, the filtering units herein disclosed are so cheap that the entire pack may be removed and economically thrown away and a new and clean pack or parts thereof readily positioned in place of the old.

While the disk as shown is circular in form, it will be understood that such shape is not material to the invention, but that the disk and casing may be square or they may have any other conventional outline.

Furthermore, the filtering pack comprising the central perforated support and filtering units may be used as a unit for filtering purposes in some cases without an outer casing by plugging one end of the central perforated support and attaching a hose or the like to the other end and immersing the pack in the liquid to be filtered.

I claim:

1. A filter comprising a base, a post removably secured in the base, a casing wall supported on the base around the post, a removable perforated tube surrounding the post but leaving an outlet passage between the post and tube, a removable top plate resting upon the upper end of the casing wall, a filter pack supported on the tube and composed of a series of removable units each of which is formed of two pads connected at their peripheries and having spacing means between the peripheries and the tube, filtering pulp washers separating the bottom unit from the base, the adjacent units from each other and the top unit from the top plate, the top plate and the base having annular shoulders engaging the adjacent washers, means for admitting liquid to the inside of the casing around the filter pack and clamping means engaging the upper end of the post and the top plate for compressing the parts of the filter pads together between the base and the top plate.

2. A filter comprising a base, a post removably secured in the base, a removable casing wall supported on the base around the post, a removable tube surrounding the post but leaving an outlet passage between the post and tube, said tube being perforated for its entire length a top plate surrounding the tube and resting upon the upper end of the casing wall, a removable filter pack supported on the tube and composed of a series of units each of which is formed of two thick pulp pads connected at their peripheries and having spacing means between the peripheries and the tube, filtering pulp washers separating the bottom unit from the base, the adjacent units from each other and the top unit from the top plate, the top plate and the base having annular shoulders engaging the adjacent washers means for admitting liquid to the inside of the casing around the filter pack and clamping means engaging the upper end of the post and the top plate for drawing the top plate against the upper end of the casing wall and at the same time compressing the parts of the filter pads together between the base and the top plate.

3. A filter having a pack of centrally perforated non-metallic filtering units each composed of two self-supporting thick pulp discs secured together at their peripheries with embossed paper spacers between them, the projections on said spacers facing the discs and porous pulp filtering washers between adjacent units.

4. A filter having a pack of centrally perforated non-metallic filtering units each composed of two thick self-supporting pulp discs secured together at their peripheries with embossed paper spacers between them, the projections on said spacers facing the discs and coated with varnish and separating washers between adjacent units.

5. A filter pack composed of a series of centrally perforated units each composed of two self-supporting thick pads of pulp material secured together at their peripheries and spaced apart inwardly by embosed coated paper spacers to provide passages for liquid and washer-like separator means between adjacent units formed of fibrous filtering material.

6. A filter unit comprising two self-supporting thick fibrous pulp pads secured together at their peripheries and two embossed paper spacers coated with a waterproof stiffening material between at least the major areas of the pads the projections on said spacers facing the pads, said pads and spacers being centrally perforated for assembly upon a tubular support.

SAMUEL ALSOP.